United States Patent
Chou et al.

(10) Patent No.: US 12,476,680 B2
(45) Date of Patent: Nov. 18, 2025

(54) HIGH SPATIAL RESOLUTION MIMO PRECODING FOR UPLINK COMMUNICATION

(71) Applicant: MediaTek Singapore Pte. Ltd., Singapore (SG)

(72) Inventors: Tzu-Han Chou, San Jose, CA (US); Jiann-Ching Guey, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 96 days.

(21) Appl. No.: 18/556,707

(22) PCT Filed: Jun. 16, 2022

(86) PCT No.: PCT/CN2022/099140
§ 371 (c)(1),
(2) Date: Oct. 23, 2023

(87) PCT Pub. No.: WO2022/267972
PCT Pub. Date: Dec. 29, 2022

(65) Prior Publication Data
US 2024/0223247 A1 Jul. 4, 2024

Related U.S. Application Data

(60) Provisional application No. 63/212,744, filed on Jun. 21, 2021.

(51) Int. Cl.
H04B 7/0456 (2017.01)
H04B 7/0404 (2017.01)

(52) U.S. Cl.
CPC ......... H04B 7/0486 (2013.01); H04B 7/0404 (2013.01); H04B 7/0456 (2013.01)

(58) Field of Classification Search
CPC .. H04B 7/0404; H04B 7/0456; H04B 7/0486; H04B 7/0639; H04B 7/06966; H04L 5/0044; H04L 25/0202; H04L 25/0224
(Continued)

(56) References Cited

U.S. PATENT DOCUMENTS 8,493,836 B2 * 7/2013 Lee ................... H04L 27/2636
370/344
8,553,799 B2 10/2013 Wang et al.
(Continued)

FOREIGN PATENT DOCUMENTS

CN 102035626 A 4/2011
CN 103201962 A 7/2013
(Continued)

OTHER PUBLICATIONS

International Search Report and Written Opinion dated Jul. 27, 2022, issued in application No. PCT/CN2022/099140.
(Continued)

Primary Examiner — Young T. Tse
(74) Attorney, Agent, or Firm — McClure, Qualey & Rodack, LLP

(57) ABSTRACT

A user equipment (UE) with N transmit (Tx) antenna elements in a wireless network receives precoding information from a base station. The UE constructs a full-rank complex Hadamard matrix (CHM) of order N using the precoding information. The UE then precodes uplink signal using a precoding matrix composed of one or more columns of the full-rank CHM, and transmits the precoded uplink signal to the base station.

20 Claims, 6 Drawing Sheets

(58) Field of Classification Search
USPC .............. 375/259, 260, 267; 370/328, 334; 455/456.3, 456.5, 456.6
See application file for complete search history.

(56) References Cited

U.S. PATENT DOCUMENTS

| | | | |
|---|---|---|---|
| 9,654,193 B2 | 5/2017 | Gaal et al. | |
| 2012/0257685 A1* | 10/2012 | Khojastepour | H04B 7/0456 375/267 |
| 2013/0195214 A1* | 8/2013 | Zhang | H04B 7/0456 375/267 |
| 2016/0036507 A1* | 2/2016 | Wang | H04B 7/0639 375/267 |
| 2016/0233935 A1* | 8/2016 | Ko | H04B 7/0669 |
| 2017/0264346 A1* | 9/2017 | Yue | H04B 7/0417 |
| 2021/0007138 A1* | 1/2021 | Xu | H04L 27/2607 |

FOREIGN PATENT DOCUMENTS

| | | | | |
|---|---|---|---|---|
| CN | 105978655 A | | 9/2016 | |
| CN | 110365378 A | | 10/2019 | |
| EP | 2374221 B | * | 9/2019 | ........... H04B 7/0417 |
| WO | 2015/099511 A1 | | 7/2015 | |

OTHER PUBLICATIONS

Huawei; "Differential feedback for Rel.10;" 3GPP TSG RAN WG1 meeting #60bis; R1-101962; Apr. 2010; pp. 1-5.

* cited by examiner

HIGH SPATIAL RESOLUTION MIMO PRECODING FOR UPLINK COMMUNICATION

CROSS-REFERENCE TO RELATED APPLICATIONS

This application claims the benefit of U.S. Provisional Application No. 63/212,744 filed Jun. 21, 2021, the entirety of which is incorporated by reference herein.

TECHNICAL FIELD

Embodiments of the invention relate to wireless communications; more specifically, to the improvement of uplink transmission in a wireless network.

BACKGROUND

The Fifth Generation New Radio (5G NR) is a telecommunication standard for mobile broadband communications. NR is promulgated by the 3rd Generation Partnership Project (3GPP) to significantly improve performance metrics such as latency, reliability, throughput, etc. Furthermore, NR supports beamforming, multiple-input multiple-output (MIMO) antenna technology, and carrier aggregation.

In a 5G NR network, a user equipment (UE) can transmit one or more uplink reference signals, including a sounding reference signal (SRS), to a base station. Based on measurements of the reference signals, the base station can, for example, calculate uplink channel quality, select an uplink beam, and allocate uplink resources. The base station indicates the estimated channel quality to the UE. The UE then precodes uplink signals based on the indication from the base station.

According to the current NR, uplink MIMO codebook-based transmission supports only wideband precoding and only up to four transmit (Tx) antenna elements. Furthermore, the precoders in the current codebook may not match the antenna architecture used in a UE. For example, a UE having a small form factor (e.g., a cell phone) may not have a uniform linear array (ULA) of antennas, especially when there is a high number of Tx antennas. The current codebook design does not perform well for non-ULA antenna architecture. Additionally, the current codebook design is table-based; that is, a UE looks up a codebook table to determine a precoder vector according to the downlink control information (DCI) sent from the base station. To control the signaling overhead, the codebook table has a limited table size and, therefore, compromised spatial resolution.

Thus, the existing 5G NR technology can be further improved to benefit operators and users. These improvements may also apply to other multi-access technologies and the telecommunication standards that employ these technologies.

SUMMARY

In one embodiment, a method is performed by a user equipment (UE) with N transmit (Tx) antenna elements in a wireless network. The method comprises the steps of receiving precoding information from a base station and constructing a full-rank complex Hadamard matrix (CHM) CHM of order N using the precoding information. The method further comprises the steps of precoding uplink signal using a precoding matrix composed of one or more columns of the full-rank CHM, and transmitting the precoded uplink signal to the base station.

In another embodiment, a method is performed by a UE of N Tx antenna elements in a wireless network. The method comprises the steps of receiving precoding information from a base station via Medium Access Control (MAC) Control Element (CE) and constructing a full-rank CHM of order N using the precoding information. The method further comprises identifying a precoding matrix composed of r columns of the full-rank CHM, where $1 \leq r \leq N$, and transmitting an uplink signal precoded with the precoding matrix to the base station.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
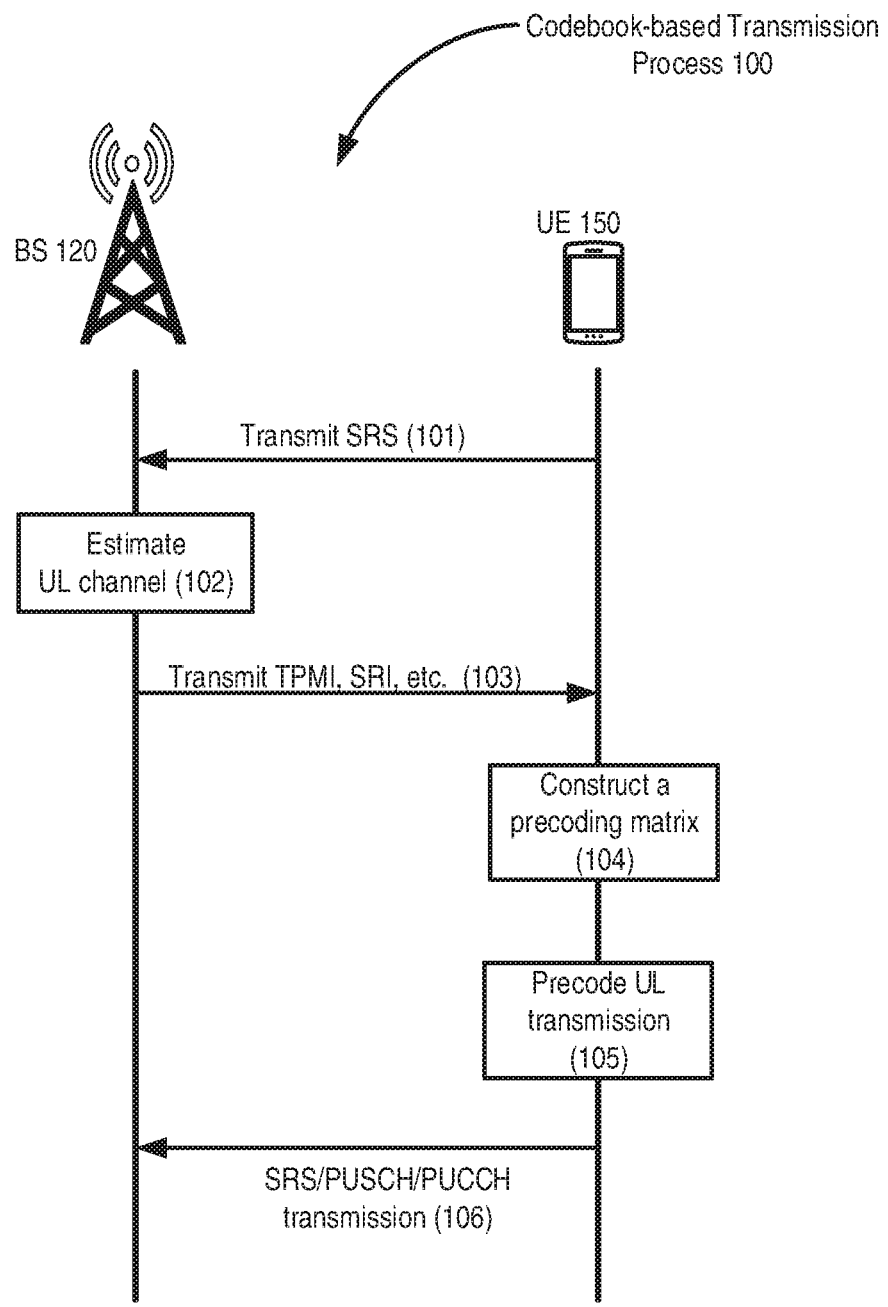
FIG. 1 is a diagram illustrating codebook-based uplink transmission according to one embodiment.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide high spatial resolution MIMO precoding for uplink (UL) transmission. A UE with N transmit (Tx) antenna elements receives precoding information from a base station. The UE constructs a precoding matrix based on the precoding information. The UE precodes an uplink signal using the precoding matrix, and sends the precoded uplink signal to the base station. In one embodiment, the precoding matrix includes one or more columns of a square complex Hadamard matrix (CHM) of order N. In one embodiment, this CHM (also referred to as the "full-rank CHM") can be constructed from a Kronecker product of lower-order CHMs, and each of these lower-order CHMs is constructed from a respective one of the diagonal matrices defined by the angular parameters (a.k.a. phase parameters) from the base station.

The precoding information transmitted by the base station may include additional parameters that are used by the UE to construct the lower-order CHMs, and to select r columns of the full-rank CHM as the precoding matrix where r is the number of transmission layers (also referred to as "layers", "transmission layers", or "ranks"). The base station transmits the precoding information using control signals, including but not limited to: downlink control information (DCI) transmitted through the Physical Downlink Control Channel (PDCCH), layer-2 (L2) signaling such as Medium Access Control (MAC) Control Element (MAC CE), and/or layer-3 (L3) signaling such as Radio Resource Control (RRC) signaling. In one embodiment, a base station may transmit the precoding information via MAC CE or a combination of MAC CE and DCI. The choice between MAC CE and DCI may depend on the dynamic or static characteristics of the uplink transmission.

Embodiments of the invention address a number of key considerations in the design of MIMO precoding. The precoding matrix described herein is a constant modulus matrix where the magnitude of each element is one. The constant modulus property provides a precoder design with balanced power across transmit (Tx) antenna elements. Power balance is a key design consideration for uplink transmission, because imbalanced antenna power causes power amplifier inefficiency and/or performance degradation. Moreover, the precoding matrix described herein enables a high spatial resolution MIMO design that adapts to various UE antenna array architectures, including a uniform linear array (ULA) and a non-uniform linear array (non-ULA). A transmission scheme for transmitting the precoding information is also described herein to reduce the signaling overhead caused by the high spatial resolution precoding.

The precoding matrix constructed from the precoding information is a CHM, which can achieve a finer angular (spatial) resolution compared to a table-based precoding matrix. The use of a CHM for precoding can improve the antenna directivity for both ULA and non-ULA. The use of a CHM for precoding improves the antenna directivity by suppressing the side lobes of the antenna pattern and maximizing the main lobe to sidelobe ratio.

The disclosed method, as well as the apparatus and the computer product implementing the method, can be applied to wireless communication between a base station (e.g., a gNB in a 5G NR network) and UEs. It is noted that while the embodiments may be described herein using terminology commonly associated with 5G or NR wireless technologies, the present disclosure can be applied to other multi-access technologies and the telecommunication standards that employ these technologies, such as Long Term Evolution (LTE) systems, future 3GPP systems, IEEE protocols, and the like.

FIG. 1 is a diagram illustrating a codebook-based transmission process 100 according to one embodiment. The codebook-based transmission process 100 shown in FIG. 1 is a close-loop process between a base station (BS) 120 and a UE 150 in a wireless network. In some network environments such as a 5G NR network, the BS 120 may be known as a gNodeB, a gNB, and/or the like. In an alternative network environment, a base station may be known by other names. The BS 120 and the UE 150 transmit beamformed signals to each other.

The UE 150 may also be known by other names, such as a mobile station, a subscriber unit, and/or the like. The UE 150 may be stationary or mobile. Examples of the UE 150 may include a cellular phone (e.g., a smartphone), a wireless communication device, a handheld device, a laptop computer, a tablet, a gaming device, a wearable device, an entertainment device, a sensor, an infotainment device, Internet-of-Things (IOT) devices, or any device that can communicate via a wireless medium. The UE 150 can be configured to receive and transmit signals over an air interface to one or more cells in a radio access network.

In one embodiment, both the BS 120 and the UE 150 support multiple-input multiple-output (MIMO) transmissions. For MIMO transmissions, a transmitter may utilize multiple transmit (Tx) antenna elements for data transmission to a receiver equipped with multiple receive (Rx) antenna elements.

The UE 150 transmits one or more uplink reference signals including a sounding reference signal (SRS) to the BS 120. An SRS is an uplink physical signal that enables a base station to estimate the channel quality over a range of frequencies. An SRS can be periodic, aperiodic, or semi-persistent.

The UE 150 at step 101 transmits an SRS to the BS 120. Based on measurements of the SRS, the BS 120 can, for example, calculate uplink channel quality, select an uplink beam, and allocate uplink resources. Furthermore, the BS 120 at step 102 estimates the uplink channel condition based on measurements of the SRS, and determines precoding information for the UE 150 to precode uplink signals. The BS 120 at step 103 sends precoding information including a Transmit Precoding matrix Indicator (TPMI) to the UE 150. The precoding information may also include a rank indicator (RI), which indicates the number of spatially multiplexed transmission layers to be transmitted by the UE. The RI may be part of the TPMI or a separate parameter. In one embodiment, the precoding information may include one or more column indices selections, according to which the UE 150 at step 104 forms a precoding matrix from the full-rank CHM.

The BS 120 at step 103 may also send an SRS resource indicator (SRI) to the UE to identify an SRS resource in the SRS resource set for use in precoded transmissions. In addition, the BS 120 may also determine the modulation and coding state (MCS) and the uplink resources where PUSCH is to be transmitted based on channel measurements derived from the UE's SRS transmissions.

The UE at step 104 constructs a precoding matrix based on the precoding information sent by the BS 120 at step 103. The precoding matrix is composed of r columns of a full-rank CHM constructed by the UE, where the value r is given by the RI. The UE at step 105 applies each column of the precoding matrix to an uplink transmission layer, and at step 106 transmits precoded transmission of SRS, physical uplink control channel (PUCCH), and physical uplink shared channel (PUSCH) to the BS 120.

In non-codebook transmission, such as Time-Division Duplex (TDD) communication between a base station and a UE that share the same frequency resource, the UE may measure a downlink reference signal (e.g., channel state information reference signal (CSI-RS)) to estimate the uplink channel condition. The UE can construct a full-rank CHM based on the estimated uplink channel condition, using the CHM construction methods to be described below.

Figure 2:
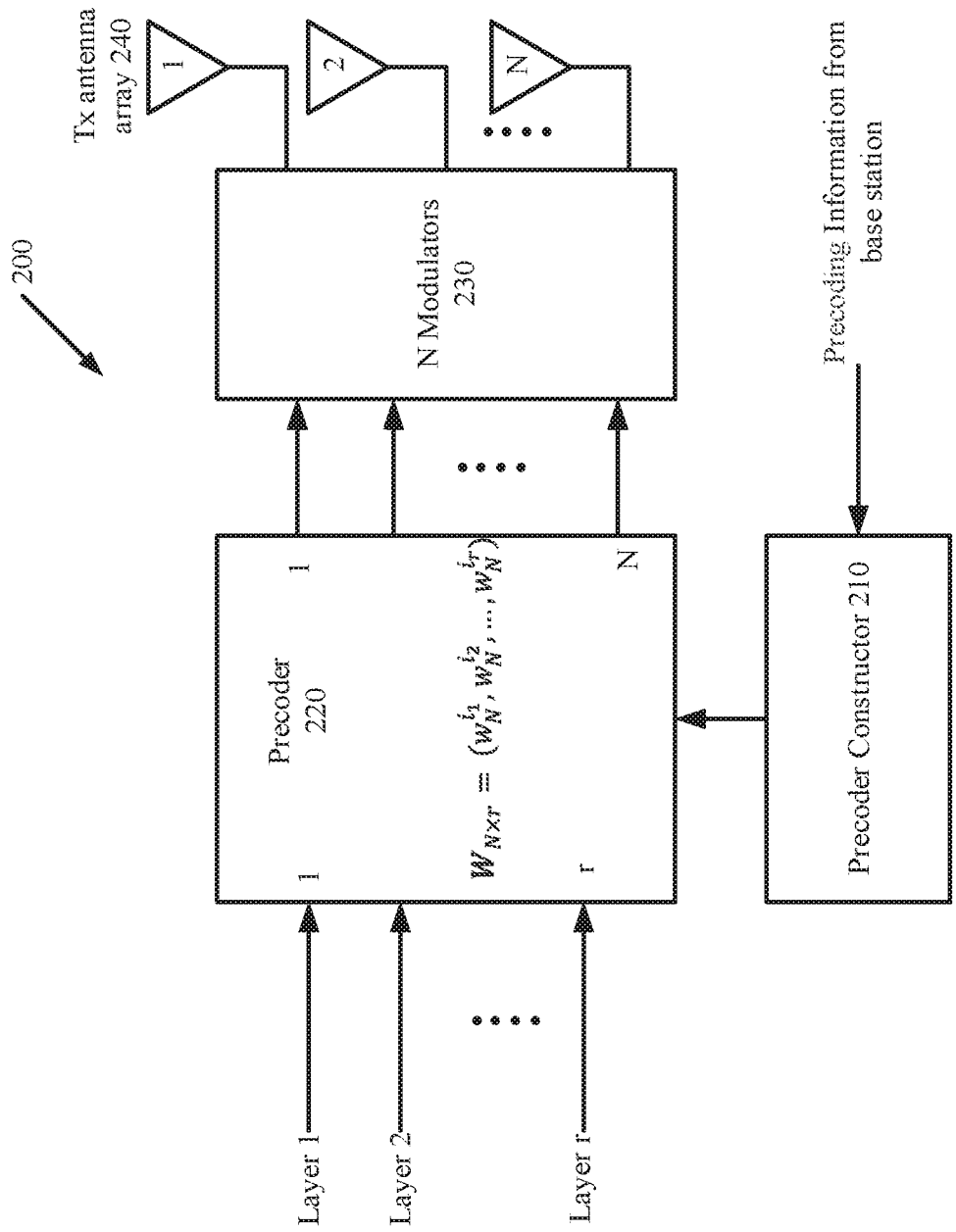
FIG. 2 is a block diagram illustrating a transmitter unit in a UE according to one embodiment.

FIG. 2 is a block diagram illustrating a transmitter 200 in a UE according to one embodiment. The UE may be the UE 150 in FIG. 1. The transmitter 200 includes a precoder constructor 210, a precoder 220, N modulators 230, and a Tx antenna array 240 including N antenna elements.

In the following description, an N×N matrix may be referred to as a matrix of order N and denoted as $W_N$. A matrix of order N×r is indicated as $W_{N \times r}$.

In the embodiment of FIG. 2, the precoder constructor 210 receives precoding information from the base station, such as the BS 120 in FIG. 1. The precoding information includes parameters for constructing a precoding matrix $W_{N \times r}$. In one embodiment, the precoding information includes the TPMI and the RI. Using the precoding information, the precoder constructor 210 constructs a full-rank CHM (i.e., $W_N$), and then identifies or selects r columns of $W_N$ as the precoding matrix $W_{N \times r}$, where $1 \leq r \leq N$. That is, $W_{N \times r} = (w_N^{i_1}, w_N^{i_2}, \ldots, w_N^{i_r})$. In one embodiment, the precoding information transmitted from the base station to the UE includes the column indices $(i_1, i_2, \ldots, i_r)$ for forming the precoding matrix $W_{N \times r}$.

The precoder 220 applies the precoding matrix $W_{N \times r}$ to r layers of an uplink signal to spatially multiplex the r layers. The spatially multiplexed r layers can be transmitted simultaneously over the same time-and-frequency resource. The number of r is typically adapted to suit the current channel properties.

The N modulators 230 may perform orthogonal frequency-division multiplexing (OFDM) modulation for respective N output symbol streams. The output of the N modulators 230 is transmitted to the base station via the Tx antenna array 240. The Tx antenna array 240 may be a uniform linear array or a non-uniform linear array.

Before describing the details of CHM construction, it is helpful to provide a definition of CHM. A CHM W of dimension n is a n×n matrix that (1) has orthogonal columns and rows; i.e., $W^H W = WW^H = nI_n$, and (2) has constant amplitude in each element $w_{ij} \in C$ with $|w_{ij}| = 1$.

Figure 3:
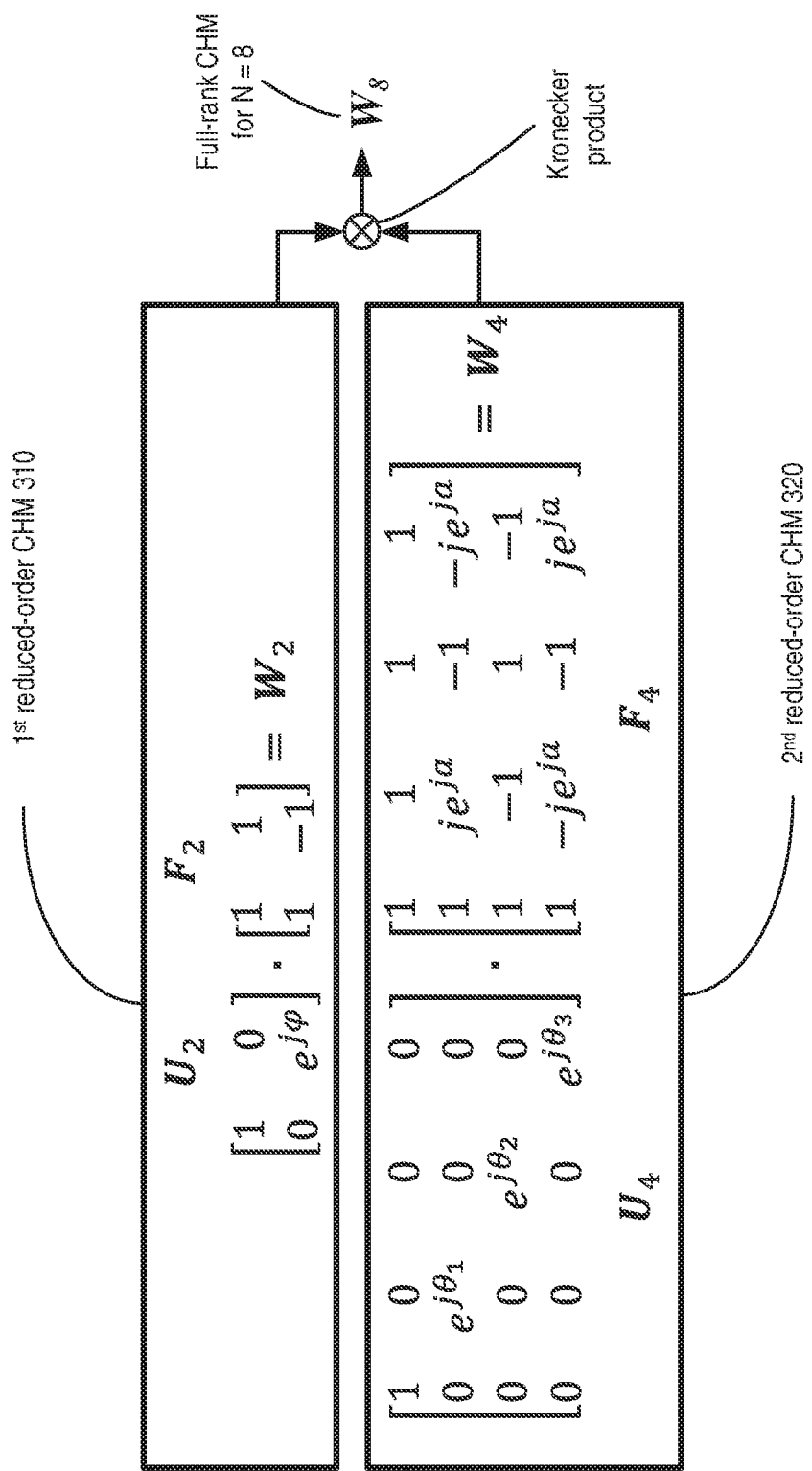
FIG. 3 is a diagram illustrating an example of precoding matrix construction according to one embodiment.

FIG. 3 illustrates an example of constructing a full-rank CHM according to one embodiment. In this example, the full-rank CHM is an 8×8 matrix $W_8$ constructed from a 2×2 matrix $W_2$ and a 4×4 matrix $W_4$. More specifically, $W_8$ is a Kronecker product of $W_2$ and $W_4$. $W_2$ is referred to as a first reduced-order CHM 310 and $W_4$ is referred to as a second reduced-order CHM 320. The term "reduced-order" indicates that the order of each CHM 310, 320 is reduced from the full order of N, where N is the number of antenna elements in UE's Tx antenna array.

It is understood that the construction method described herein is applicable to a full-rank CHM ($W_N$) of order N, where N is the number of Tx antenna elements. N can be any integer number not limited to 8. $W_N$ can be constructed from a Kronecker product of two reduced-order CHMs e.g., $W_p$ and $W_q$, where $W_p$ is a CHM of order p and $W_q$ is a CHM of order q, and p×q=N.

Referring to the example in FIG. 3, the first reduced-order CHM 310 (e.g., $W_2$) is equal to the product of a diagonal phase rotation matrix and a Discrete Fourier Transform (DFT) matrix. Given an angular parameter φ that defines a steering vector u, $W_2$ can be constructed as follows:

$$W_2 = UF_2, \text{ where } U = \text{diag}(u), u = \begin{bmatrix} 1, e^{j\varphi} \end{bmatrix}, \text{ and } F_2 = \begin{bmatrix} 1 & 1 \\ 1 & -1 \end{bmatrix}.$$

The steering vector u controls the antenna phase to align a Tx beam with a dominant departure plane wave.

There are two alternative embodiments for constructing the second reduced-order CHM 320 (e.g., $W_4$). In the first embodiment, $W_4$ is a 4×4 CHM and is a function of a steering vector u and a scalar $\alpha \in [0, \pi]$ Given the values of three angular parameters $\theta_1$, $\theta_2$, and $\theta_3$, and a scalar $\alpha \in [0, \pi]$, $W_4$ can be constructed as follows:

$$W_4 = UF_4(a), \text{ where } U = \text{diag}(u), u = \begin{bmatrix} 1, e^{j\theta_1}, e^{j\theta_2}, e^{j\theta_3} \end{bmatrix},$$

and a dephased $CHM$:

$$F_4(a) = \begin{bmatrix} 1 & 1 & 1 & 1 \\ 1 & je^{ja} & -1 & -je^{ja} \\ 1 & -1 & 1 & -1 \\ 1 & -je^{ja} & -1 & je^{ja} \end{bmatrix}.$$

In the first embodiment, as the dominant Tx beam is captured by the steering vector u, $i_1 = 1$ (i.e., the first column) of $W_4$ can be selected for rank-1 transmission.

In the second embodiment, $W_4$ is a 4×4 Householder matrix, which is also a CHM in the special case of order 4. The Householder matrix is a function of a surface normal vector $u = [1, e^{j\theta_1}, e^{j\theta_2}, e^{j\theta_3}]$. Given the values of three angular parameters $\theta_1$, $\theta_2$, and $\theta_3$, $W_4$ can be constructed as follows:

$$W_4 = I - 2\frac{uu^H}{u^H u}.$$

After constructing $W_2$ and $W_4$, the UE performs a Kronecker product of $W_2$ and $W_4$ to obtain $W_8$, which is a full-rank CHM for a Tx antenna array with 8 antenna elements. The UE then identifies a precoding matrix composed of one or more columns of $W_8$.

In some alternative embodiments, the full-rank CHM can be constructed directly. For example, a Tx antenna array with four antenna elements may use the aforementioned 4×4 Householder matrix as a full-rank CHM for uplink precoding.

The precoding scheme described herein is dynamically adaptable to coherent transmission, partial coherent transmission, and non-coherent transmission. The UE controls the relative phases of its Tx antenna elements to maximize the energy radiated in the main lobe while reducing the energy radiated in the side lobes. However, due to physical limitations (e.g., Tx antenna elements located on separate modules or panels), environmental constraints, or other considerations, sometimes not all Tx antenna elements can be controlled to have the desired relative phases.

With coherent transmission, the relative phases of the Tx antenna elements can be well-controlled to constructively form a main lobe in the desired direction. The UE uses a column of the full-rank CHM for precoding a corresponding layer of uplink transmission. Since there are no zero elements in a full-rank CHM, all antenna elements are used for precoding each layer of uplink transmission.

With partial coherent transmission, only a subset of the UE's Tx antenna elements can maintain coherence (i.e., having well-controlled relative phases). Thus, the UE may use the columns of a reduced-ordered CHM to precode uplink transmission. The reduced-ordered CHM is one of the aforementioned $W_p$ and $W_q$, which are used to construct the full-rank CHM $W_N$.

For example, a UE having four Tx antenna elements (A0, A1, A2, A3) can be configured with an active antenna subset $A^{(i_l)}=[0,2]$ and $w_2^{partial,i_l}=[1, e^{j\varphi}]$ to activate A0 and A2 for the l-th layer transmission, where $i_l \in \{1, \ldots, N\}$, $1 \leq r$, is the column index selected for l-th layer. For rank-2 partial coherence transmission, the UE may be configured to use a first subset (A0, A2) for the first layer and a second subset (A1, A3) for the second layer of uplink transmission. The UE may construct a reduced-order CHM (e.g., $W_2$ in FIG. 3) using the precoding information transmitted from the base station. It is noted that the term "full-rank" is relative to N, which is the number of the UE's Tx antenna elements. A CHM of order N is called a full-rank CHM, and a CHM of order less than N is called a reduced-rank CHM. Both a full-rank CHM and a reduced-rank CHM are square matrices. Thus, in the example of FIG. 3 where N=8, $W_2$ and $W_4$ are reduced-rank CHMs. When N=4, $W_4$ is a full-rank CHM and $W_2$ is a reduced-rank CHM.

Different active antenna subsets may use precoding matrices generated from different parameters (e.g., φ values); e.g., antenna subset (A0, A2) may use 2×2 CHM1 constructed from $\varphi_1$, and antenna subset (A1, A3) may use 2×2 CHM2 constructed from $\varphi_2$, where $\varphi_1 \neq \varphi_2$. For rank-2 transmission, the first layer may be precoded by the first or second column of CHM1 and transmitted by (A0, A2), and the second layer may be precoded by the first or second column of CHM2 and transmitted by (A1, A3). For rank-4 transmission, two layers may be precoded by the first and second columns of CHM1 and transmitted by (A0, A2), and the other two layers may be precoded by the first and second columns of CHM2 and transmitted by (A1, A3). The mapping between a layer and an antenna subset (i.e., which antenna subset transmits which layer) is configurable.

Alternatively, different active antenna subsets can use a precoding matrix generated from the same parameter(s) (e.g., the same φ value); e.g., both (A0, A2) and (A1, A3) can use 2×2 CHM1 constructed from the same φ.

Thus, the UE may receive a selection of M antenna elements (M<N) for transmitting one or more layers of the uplink signal. The UE may precode the uplink signal using a reduced-order CHM of order M. In one embodiment, M is equal to p or q, where p×q=N and the Kronecker product of $W_p$ and $W_q$ is $W_N$.

With non-coherent transmission, the relative phases of the Tx antenna elements cannot be well-controlled and the uplink signal may be transmitted via one antenna element at a given time and frequency. For example, the UE may use A0 for transmission of a first layer, and A1 for transmission of a second layer of the uplink signal. Angular (i.e., phase) parameters are not needed for non-coherent transmission.

In one embodiment, the aforementioned precoding information includes TPMI, which carries parameters including, but not limited to: the angular parameters for defining a steering vector or a surface normal vector, a scalar parameter for dephased CHM construction, column indices selection, active antenna subsets, and rank indicator (RI). In the examples of FIGS. 2 and 3, the angular parameters are $\varphi$, $\theta_1$, $\theta_2$, $\theta_3$, the scalar parameter is a for $W_4$ construction, and the column indices selection is $(i_1, i_2, \ldots, i_r)$, where $1 \leq r \leq N$. The precoding information may include active antenna subsets to indicate the antenna element(s) selected for partial or non-coherent transmission; e.g., $A^{(i_l)}$, where $i_l \in \{1, \ldots, N\}$, $1 \leq r$ is the column index selected for l-th layer. The precoding information may include RI, which is the number of layers in the uplink signal to be transmitted by the UE.

In one embodiment, the precoding information (e.g., TPMI) may include multiple column indices selections for one or more r values. Each column indices selection $(i_1, i_2, \ldots, i_r)$ for a given r value is assigned an index (Icol). Using N=4 (four Tx antenna elements) as an example, the precoding information may include multiple column indices selections such as (1, 2), (3, 4), (2, 4), (2, 3, 4), (1, 3, 4), which correspond to indices=1, 2, 3, 4, 5, respectively. Subsequently when the base station selects index=3, the UE forms a precoding matrix composed of the $2^{nd}$ and the $4^{th}$ columns of a 4×4 CHM for rank-2 transmission.

In one embodiment, different active antenna subsets may be selected for uplink transmission of different ranks. For example, antenna element A0 may be selected for non-coherent rank-1 transmission (i.e., r=1). Antenna elements (A0, A2) and (A1, A3) may be selected for partial-coherent rank-2 transmission (i.e., r=2).

According to embodiments of the invention, a base station can transmit and update the precoding information, or at least a portion thereof, using MAC CE when such an update is needed. By contrast, DCI is transmitted periodically e.g., in every subframe. Thus, transmitting the precoding information by DCI would incur a higher overhead than transmitting by MAC CE. DCI is best suited for fast-changing or dynamic precoding information, and MAC CE is best suited for substantially static (a.k.a. semi-static) precoding information.

The precoding information (e.g., TPMI) may include one or more parameters that are substantially static when the UE's position is substantially stationary, and/or when the power received from the UE has substantially constant strength. In one embodiment, when the UE is a stationary terminal and the received power from the UE is substantially constant, the base station may transmit all of the parameters in the TPMI via MAC CE. In alternative embodiments, the precoding information (such as TPMI or another indicator) may further include one or more dynamic parameters that can vary rapidly during communication. For example, the base station may, due to processing capacity or other reasons, determine to change the number of layers in the uplink signal that the UE is allowed to send. Thus, in one embodiment, RI may be a dynamic parameter and transmitted via DCI. As another example, MAC CE may be used to transmit the aforementioned multiple column indices selections and their corresponding indices Icol, and DCI may be used to transmit a selected index Icol value for the UE to form a precoding matrix.

In a first scenario, a first pre-defined DCI format may be chosen to carry a first number of bits for precoding information. The rest of the precoding information is carried by MAC CE. In a second scenario, a second pre-defined DCI format may be chosen to carry a second number of bits for precoding information, where the second number is smaller than the first number and the rest of the precoding information is carried by MAC CE. For example, when a UE is stationary and the channel condition is substantially static (as indicated by the power received from the UE), a DCI format with fewer bits for precoding information (e.g., the second pre-defined DCI format) may be chosen.

In the following description regarding uplink precoding with reference to FIGS. 4 and 5, the UE may be the UE 150 in FIG. 1, the apparatus 600 in FIG. 6, and/or any UE with the transmitter 200 in FIG. 2. The base station may be a gNb in a 5G NR network, such as the BS 120 in FIG. 1, and/or the base station 650 in FIG. 6.

Figure 4:
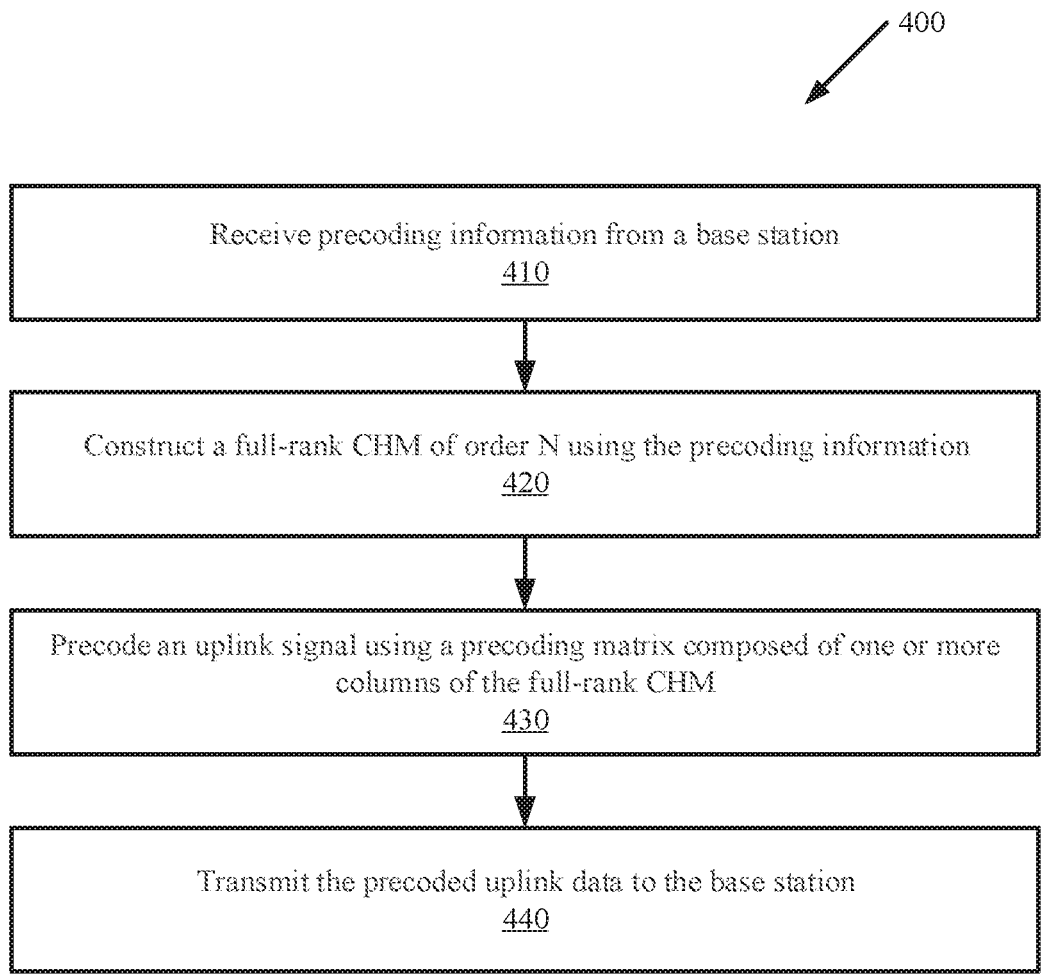
FIG. 4 is a flow diagram illustrating a method performed by a UE with N transmit antenna elements in a wireless network according to one embodiment.

FIG. 4 is a flow diagram illustrating a method 400 performed by a UE with N Tx antenna elements in a wireless network according to one embodiment. The method 400 begins at step 410 when the UE receives precoding information from a base station. The UE at step 420 constructs a full-rank CHM of order N using the precoding information. The UE at step 430 precodes an uplink signal using a precoding matrix composed of one or more columns of the full-rank CHM. At step 440, the UE transmits the precoded uplink signal to the base station.

In one embodiment, the UE may construct reduced-order CHMs using the precoding information, wherein each reduced-order CHM is a square matrix of order less than N. The UE then constructs the full-rank CHM of order N from the reduced-order CHMs. At or as part of step 420 of constructing the full-rank CHM, the UE may construct a Householder matrix of order equal to or less than N using angular parameters in the precoding information. In one embodiment, the UE receives one or more column indices from the base station, and precodes a layer of the uplink signal using a column of the full-rank CHM indicated by one of the column indices. In one embodiment, the UE receives a selection of M antenna elements (M<N) for transmitting one or more layers of the uplink signal, and precodes a layer of the uplink signal using a column of one of the reduced-order CHMs of order M. In one embodiment, the UE receives multiple column indices selections from the base station, and receives an index (Icol) identifying one of the column indices selections for forming the precoding matrix from the full-rank CHM.

Figure 5:
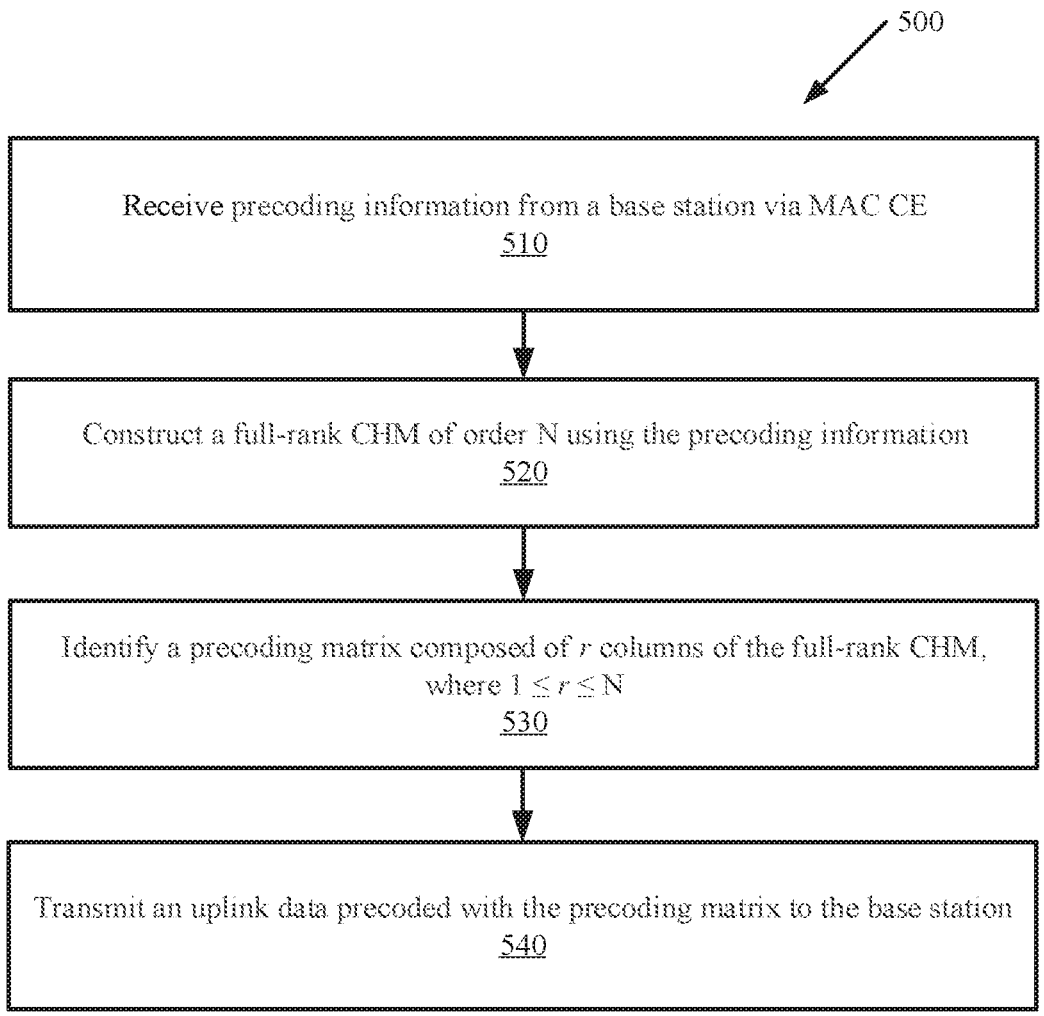
FIG. 5 is a flow diagram illustrating a method performed by a UE with N transmit antenna elements in a wireless network according to another embodiment.

FIG. 5 is a flow diagram illustrating a method 500 performed by a UE with N Tx antenna elements in a wireless network according to one embodiment. The method 500 begins at step 510 when the UE receives precoding information from a base station via MAC CE. The UE at step 520 constructs a full-rank CHM of order N using the precoding information. The UE at step 530 identifies a precoding matrix composed of r columns of the full-rank CHM, where $1 \leq r \leq N$. At step 540, the UE transmits an uplink signal precoded with the precoding matrix to the base station.

In one embodiment, the UE may receive a first part of TPMI from the base station via the MAC CE, and receive a second part of the TPMI from the base station via DCI. The second part of the TPMI may include the RI. In another embodiment, the UE may receive the entire TPMI, including the RI, via the MAC CE. For example, when the UE is a stationary terminal, the UE may identify a precoding matrix using the precoding information transmitted via the MAC CE. In one embodiment, the UE receives multiple column indices selections from the base station via the MAC CE, and receives an index (Icol) via DCI identifying one of the column indices selections for forming the precoding matrix from the full-rank CHM.

The operations of the flow diagrams of FIGS. 4 and 5 have been described with reference to the exemplary embodiments of FIGS. 1, 2, and 6. However, it should be understood that the operations of the flow diagrams of FIGS. 4 and 5 can be performed by embodiments of the invention other than the embodiments of FIGS. 1, 2, and 6, and the embodiments of FIGS. 1, 2, and 6 can perform operations different than those discussed with reference to the flow diagrams. While the flow diagrams of FIGS. 4 and 5 show a particular order of operations performed by certain embodiments of the invention, it should be understood that such order is exemplary (e.g., alternative embodiments may perform the operations in a different order, combine certain operations, overlap certain operations, etc.).

Figure 6:
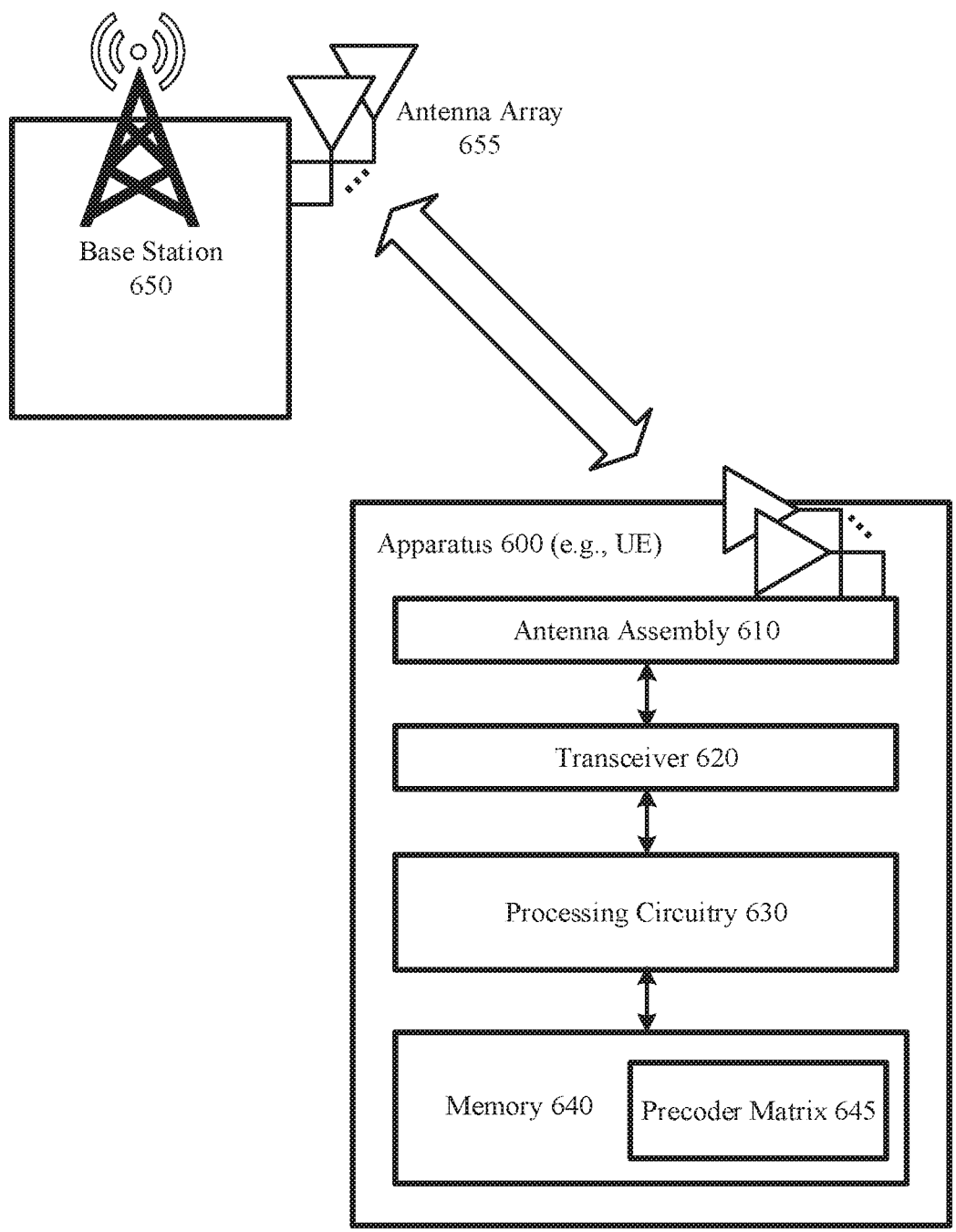
FIG. 6 is a block diagram illustrating an apparatus that performs wireless communication according to one embodiment.

FIG. 6 is a block diagram illustrating elements of an apparatus 600 performing wireless communication with a base station 650 according to one embodiment. In one embodiment, the apparatus 600 may be a UE and the base station 650 may be a gNb or the like, both of which may operate in a wireless network, such as a 5G NR wireless network or another multi-access wireless network. In one embodiment, the apparatus 600 may be the UE 150 in FIG. 1. In one embodiment, the base station 650 includes an antenna array 655 to form beams for transmitting and receiving signals. The signals transmitted from the base station 650 to the apparatus 600 includes precoding information, which is used by the apparatus 600 to construct a precoding matrix for precoding uplink signals.

As shown, the apparatus 600 may include an antenna assembly 610; e.g., MIMO antenna arrays, to support beamforming operations, and a transceiver circuit (also referred to as a transceiver 620) including a transmitter and a receiver configured to provide radio communications with another station in a radio access network. The transmitter and the receiver may include filters in the digital front end for each cluster, and each filter can be enabled to pass signals and disabled to block signals. The transceiver 620 is operative to receive downlink signals (e.g., MAC CE and DCI) and transmit uplink signals according to methods 400 and 500 in FIGS. 4 and 5, respectively. The apparatus 600 may also include processing circuitry 630 which may include one or more control processors, signal processors, central processing units, cores, and/or processor cores. The processing circuitry 630 is operative to construct CHMs based on the precoding information from the base station 650. The apparatus 600 may also include a memory circuit (also referred to as memory 640) coupled to the processing circuitry 630. The memory 640 may store a precoding matrix 645 that is formed based on the constructed CHMs. The apparatus 600 may also include an interface (such as a user interface). The apparatus 600 may be incorporated into a wireless system, a station, a terminal, a device, an appliance, a machine, a vehicle, and IoT operable to perform wireless communication in a multi-access network, such as a 5G NR network. It is understood the embodiment of FIG. 6 is simplified for illustration purposes. Additional hardware components may be included.

In one embodiment, the apparatus 600 may store and transmit (internally and/or with other electronic devices over a network) code (composed of software instructions) and data using computer-readable media, such as non-transitory tangible computer-readable media (e.g., computer-readable storage media such as magnetic disks; optical disks; read-only memory; flash memory devices) and transitory computer-readable transmission media (e.g., electrical, optical, acoustical or other forms of propagated signals). For example, the memory 640 may include a non-transitory computer-readable storage medium that stores computer-readable program code. The code, when executed by the processors, causes the processors to perform operations according to embodiments disclosed herein, such as methods 4 and 5 disclosed in FIGS. 4 and 5, respectively.

Although the apparatus 600 is used in this disclosure as an example, it is understood that the methodology described herein is applicable to any computing and/or communication device capable of performing wireless communications.

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a user equipment (UE) with N transmit (Tx) antenna elements in a wireless network, wherein N is an integer value, the method comprising:
receiving precoding information from a base station;
constructing a full-rank complex Hadamard matrix (CHM) of order N using the precoding information;
precoding an uplink signal using a precoding matrix composed of one or more columns of the full-rank CHM; and
transmitting the precoded uplink signal to the base station.

2. The method of claim 1, wherein constructing the full-rank CHM comprises:
constructing reduced-order CHMs using the precoding information, wherein each reduced-order CHM is a square matrix of order less than N; and
constructing the full-rank CHM of order N from the reduced-order CHMs.

3. The method of claim 2, wherein the precoding information includes angular parameters for constructing the reduced-order CHMs.

4. The method of claim 2, wherein
a scalar parameter $\alpha \in [0, \pi]$ is a part of the precoding information and
each of the reduced-order CHMs includes a dephased Hadamard matrix defined by the scalar parameter.

5. The method of claim 2, wherein N=8, and the reduced-order CHMs include a first square matrix of order 2 and a second square matrix of order 4.

6. The method of claim 1, wherein constructing the full-rank CHM comprises:
constructing a Householder matrix of order equal to or less than N using angular parameters in the precoding information.

7. The method of claim 1, further comprising:
receiving one or more column indices from the base station; and
precoding a layer of the uplink signal using a column of the full-rank CHM indicated by one of the column indices.

8. The method of claim 1, further comprising:
receiving a selection of M transmit antenna elements (where M is an integer value, M<N, and thus the M transmit antenna element is a subset of the N Tx antenna elements) for transmitting one or more layers of the uplink signal; and
precoding a layer of the uplink signal using a column of one of reduced-order CHMs of order M.

9. The method of claim 1, further comprising:
receiving a plurality of column indices selections from the base station; and
receiving an index identifying one of the column indices selections for forming the precoding matrix from the full-rank CHM.

10. The method of claim 1, further comprising:
receiving at least a portion of a Transmitted Precoding Matrix Indicator (TPMI) from the base station via Medium Access Control (MAC) Control Element (CE).

11. A method performed by a user equipment (UE) of N transmit (Tx) antenna elements in a wireless network, wherein N is an integer value the method comprising:
receiving precoding information from a base station via Medium Access Control (MAC) Control Element (CE);
constructing a full-rank complex Hadamard matrix (CHM) of order N using the precoding information;
identifying a precoding matrix composed of r columns of the full-rank CHM, where $1 \leq r \leq N$; and
transmitting an uplink signal precoded with the precoding matrix to the base station.

12. The method of claim 11, further comprising:
receiving a first part of a Transmitted Precoding Matrix Indicator (TPMI) from the base station via the MAC CE; and
receiving a second part of the TPMI from the base station via downlink control information (DCI).

13. The method of claim 11, further comprising:
receiving a rank indicator (RI) from the base station via downlink control information (DCI), the RI indicating the number of layers in the uplink signal to be transmitted by the UE.

14. The method of claim 11, wherein constructing the full-rank CHM comprises:
receiving angular parameters from the base station via the MAC CE; and
constructing the full-rank CHM based on, at least in part, the angular parameters.

15. The method of claim 11, further comprising:
receiving a plurality of column indices selections from the base station via the MAC CE; and
receiving an index via downlink control information (DCI) identifying one of the column indices selections for forming the precoding matrix from the full-rank CHM.

16. The method of claim 11, wherein constructing the full-rank CHM comprises:
constructing reduced-order CHMs based on, at least in part, the precoding information transmitted via the MAC CE, wherein each reduced-order CHM is a square matrix of order less than N; and
constructing the full-rank CHM from the reduced-order CHMs.

17. The method of claim 16, further comprising:
receiving, via the MAC CE, a scalar parameter $\alpha \in [0, \pi]$ that defines a dephased Hadamard matrix as one of the reduced-order CHMs.

18. The method of claim 16, further comprising:
receiving a selection of M transmit antenna elements (where Mis an integer value, M<N, and thus the M transmit antenna element is a subset of the N Tx antenna elements) for transmitting one or more layers of the uplink signal; and
precoding a layer of the uplink signal using a column of one of the reduced-order CHMs of order M.

19. The method of claim 16, wherein N=8, and the reduced-order CHMs include a first square matrix of order 2 and a second square matrix of order 4.

20. The method of claim 11, wherein, when the UE is a stationary terminal, the precoding matrix is identified using the precoding information transmitted via the MAC CE.

* * * * *